July 11, 1967
R. D. HEFFELFINGER ETAL
3,330,310
CARTON FILLING APPARATUS
Original Filed Aug. 10, 1962
10 Sheets-Sheet 2
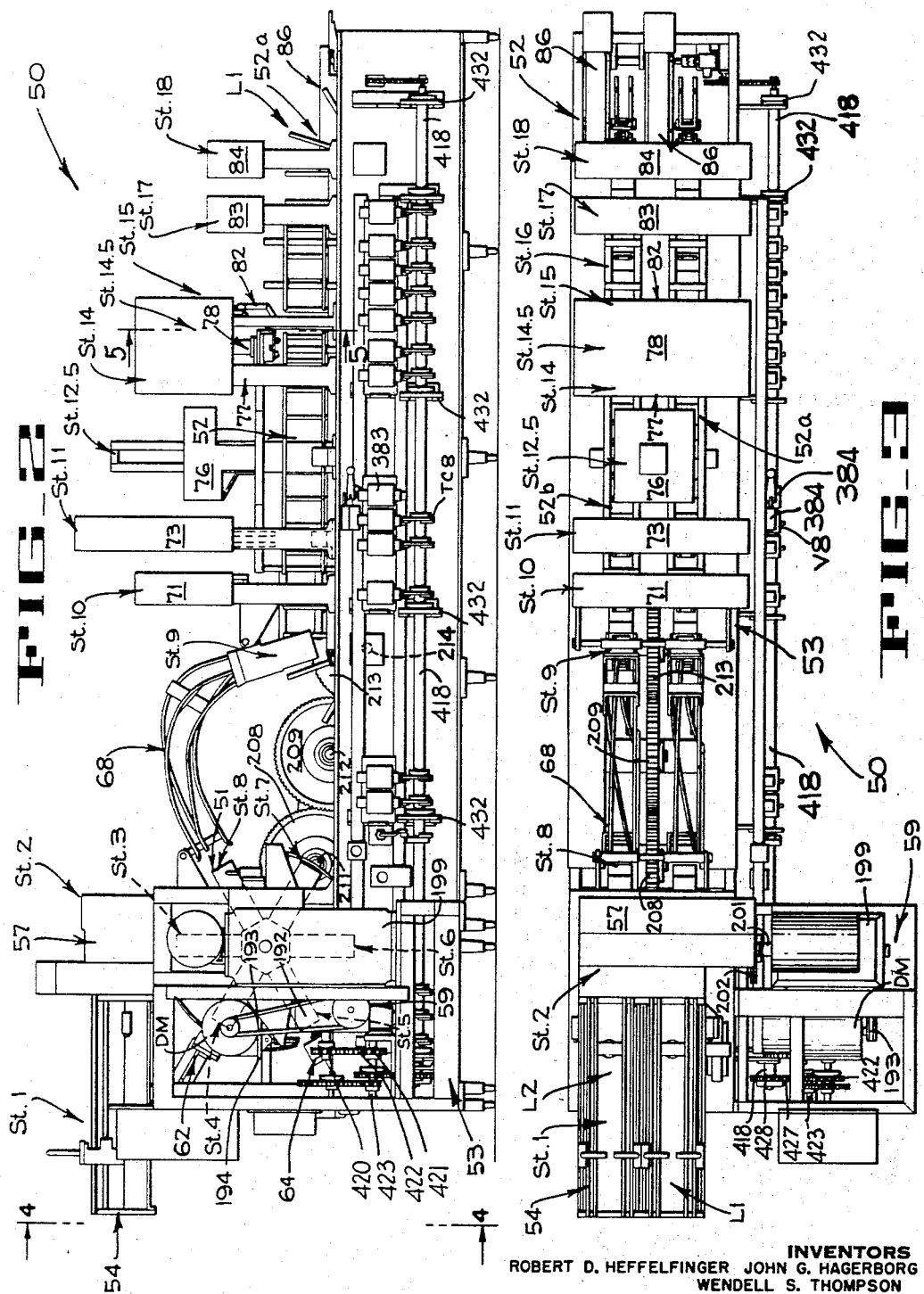
INVENTORS
ROBERT D. HEFFELFINGER JOHN G. HAGERBORG
WENDELL S. THOMPSON
HENRY A. OLDENKAMP
BY F. W. Anderson
ATTORNEY

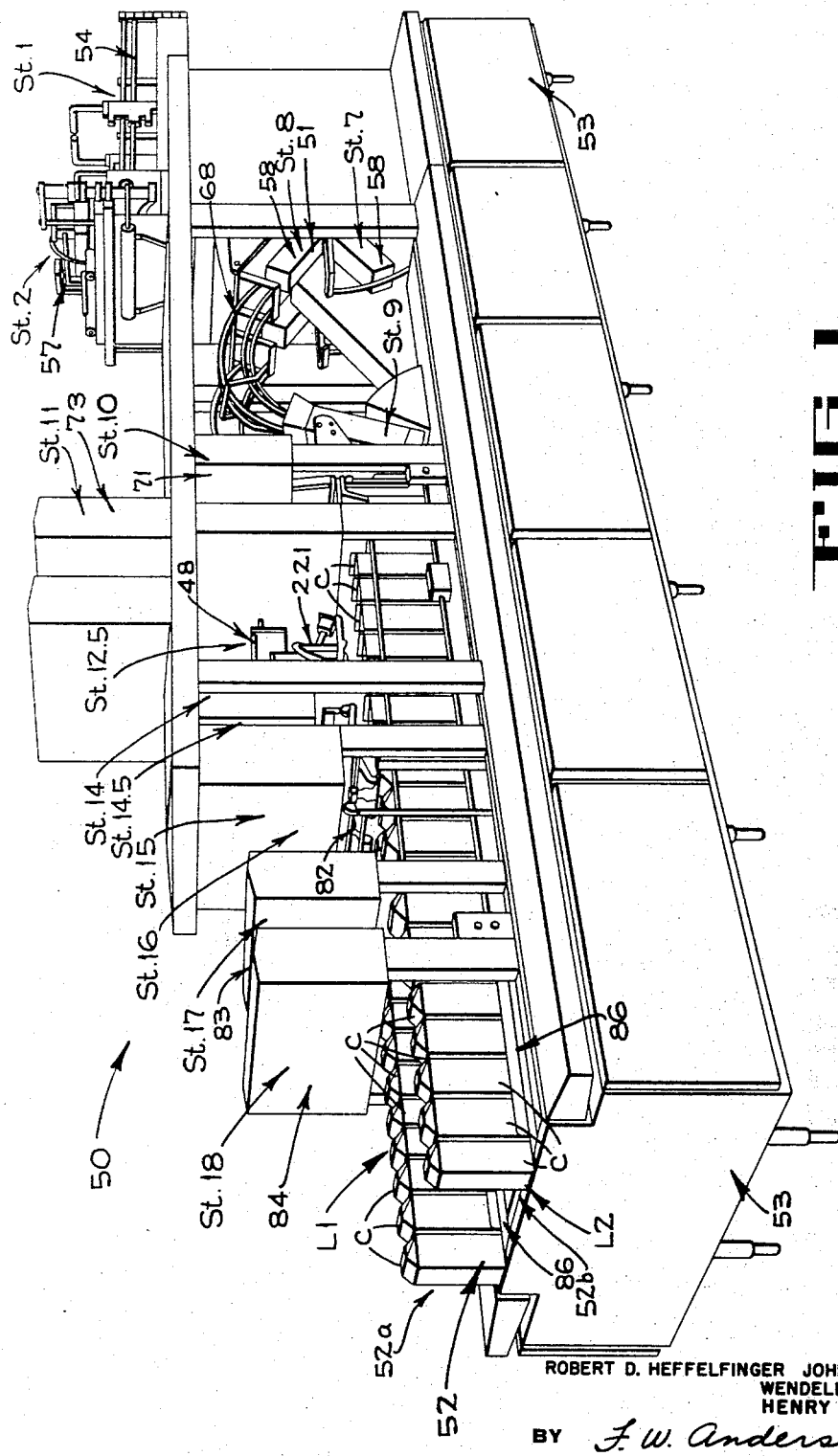

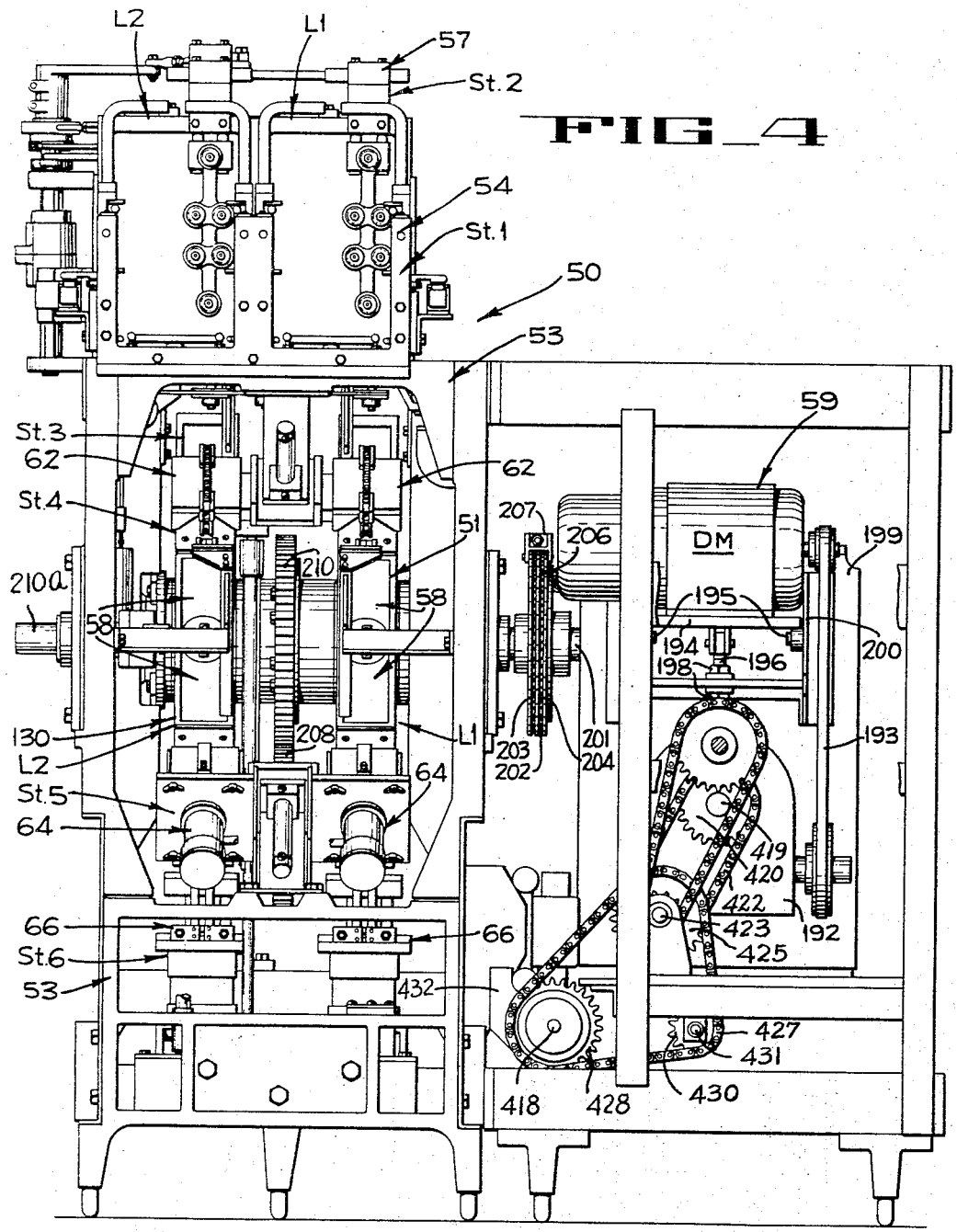

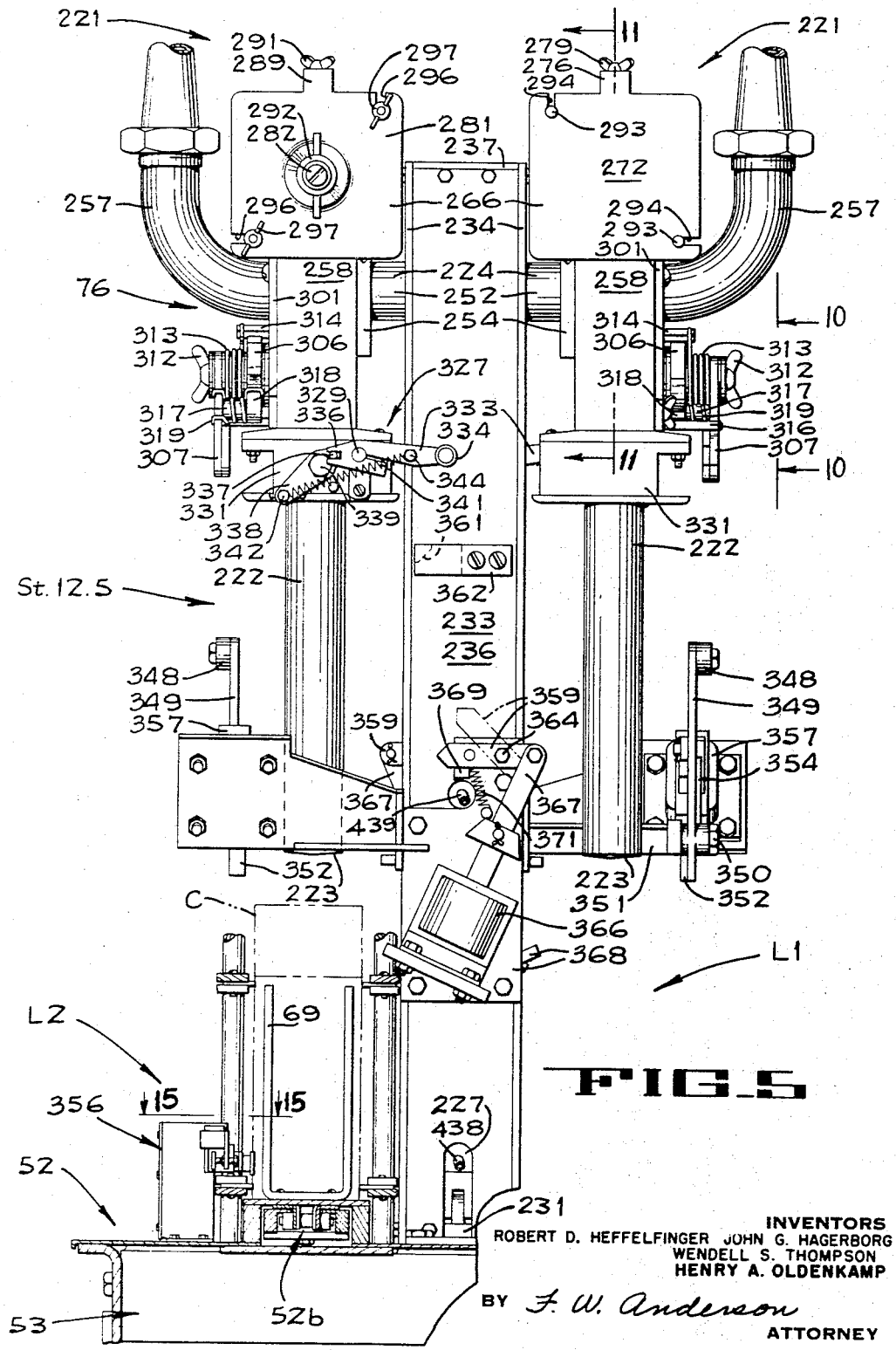

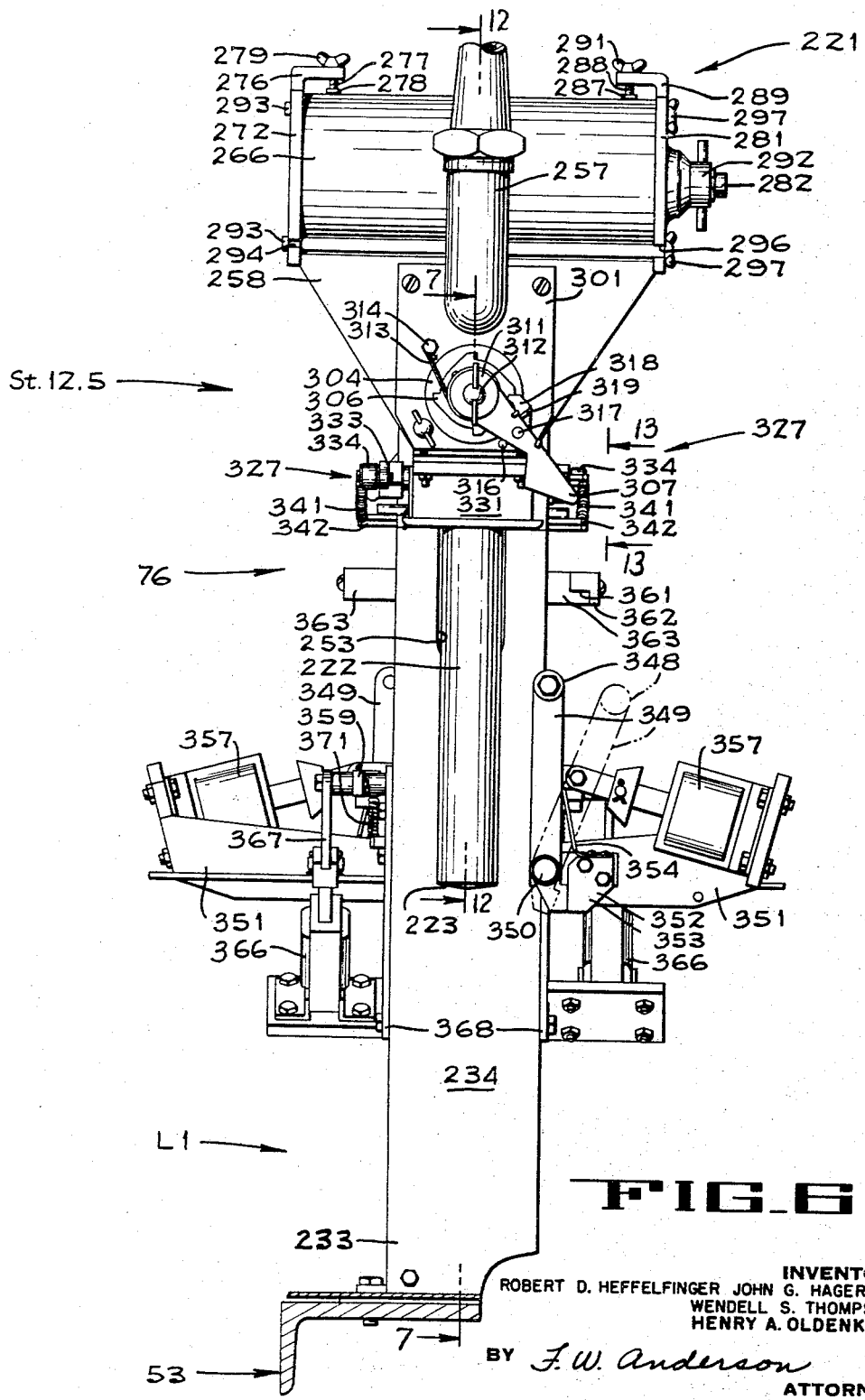

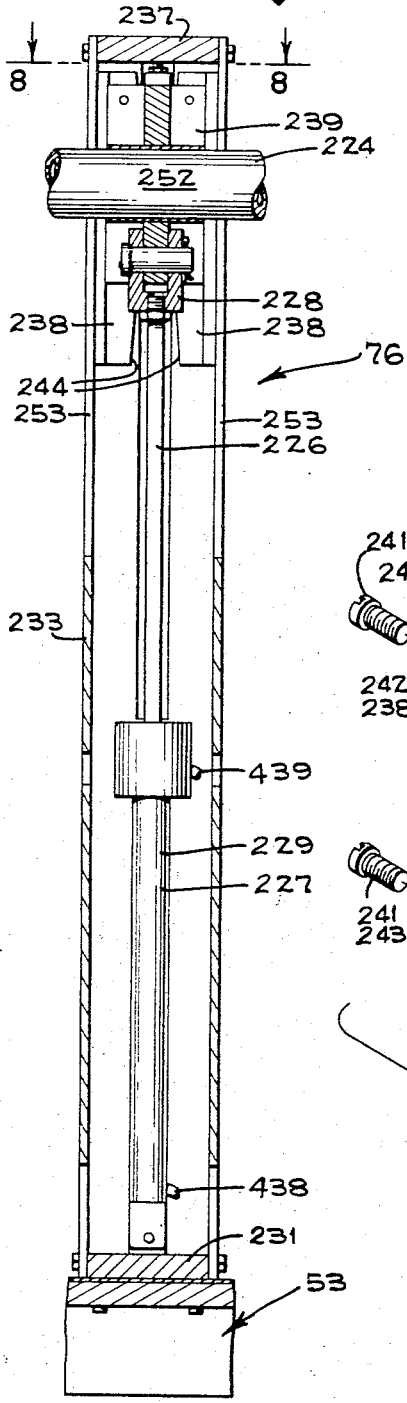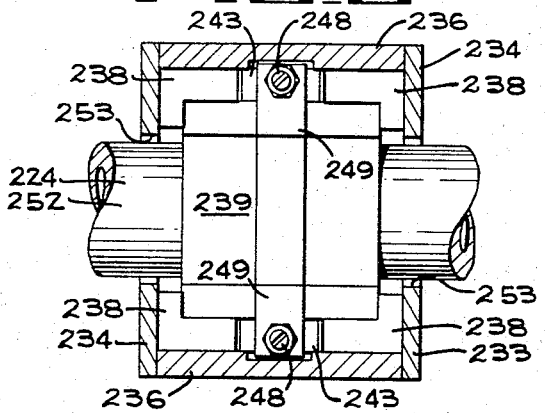

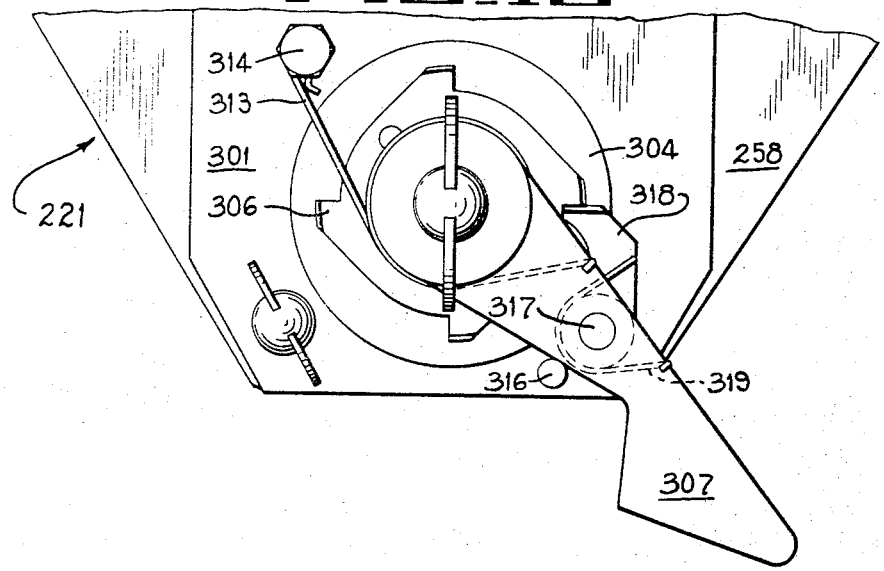
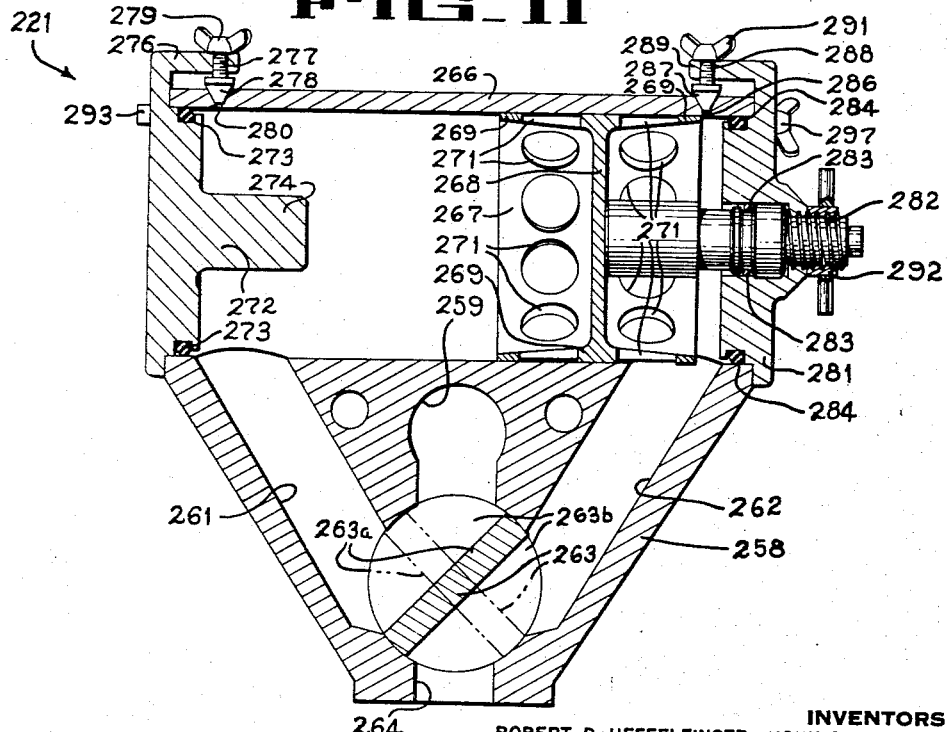

July 11, 1967 R. D. HEFFELFINGER ETAL 3,330,310
CARTON FILLING APPARATUS
Original Filed Aug. 10, 1962 10 Sheets-Sheet
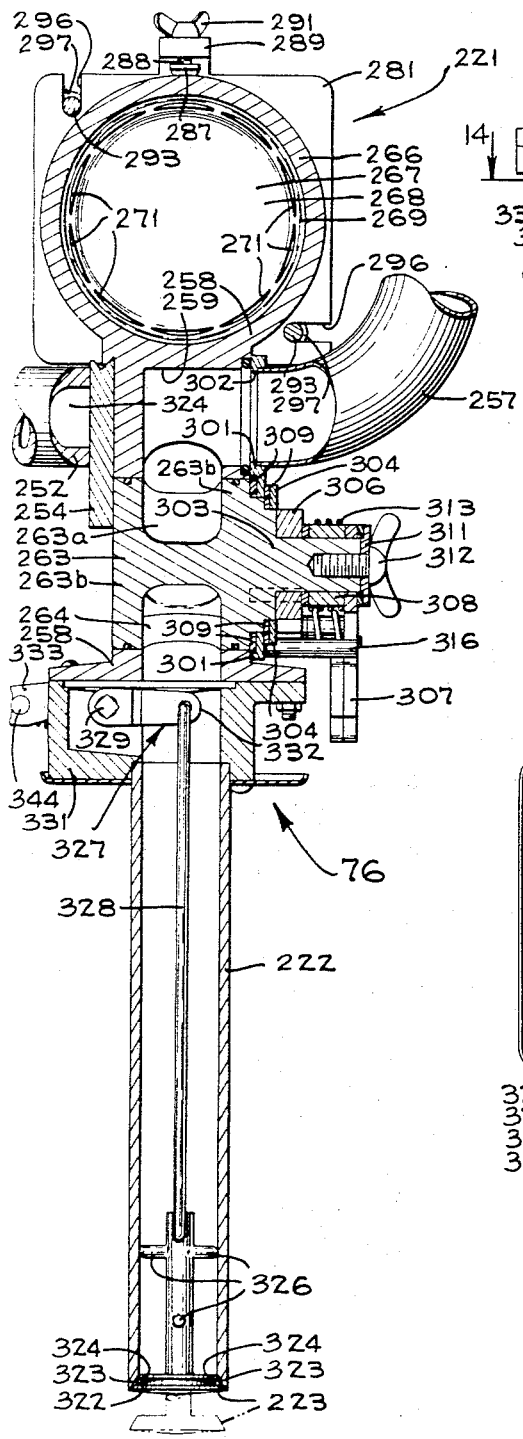
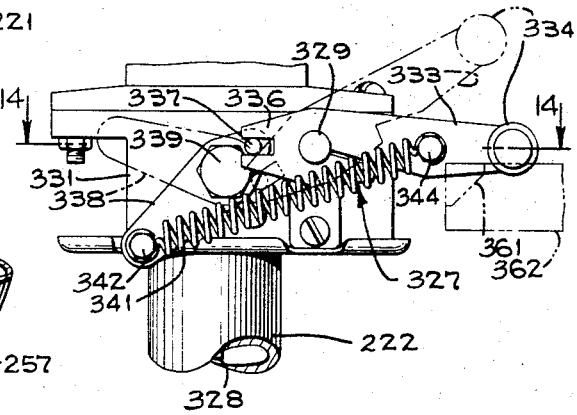
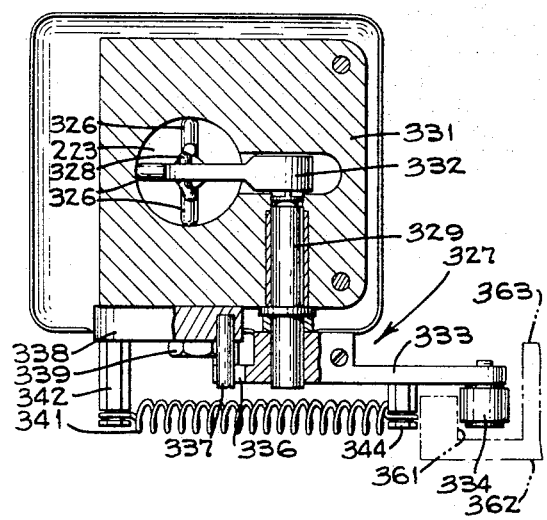
INVENTORS
ROBERT D. HEFFELFINGER JOHN G. HAGERBORG
WENDELL S. THOMPSON
HENRY A. OLDENKAMP
BY F. W. Anderson
ATTORNEY

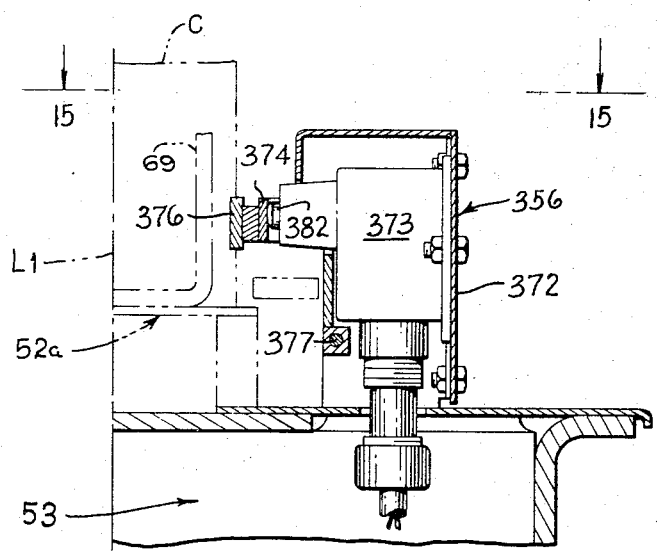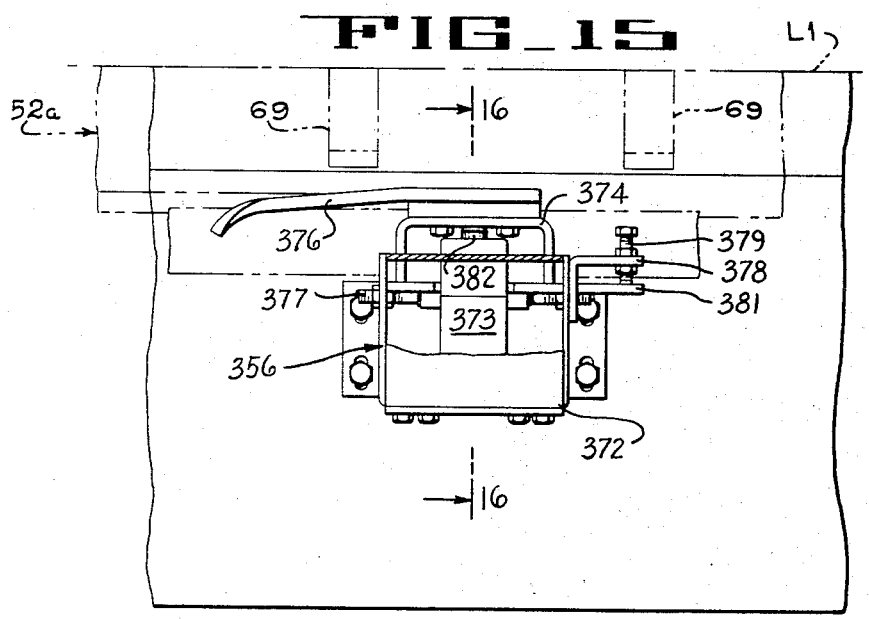

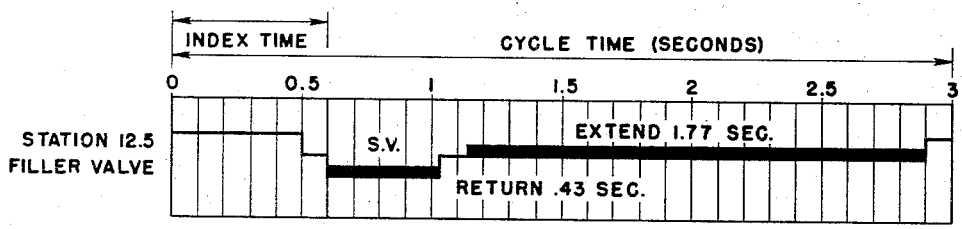
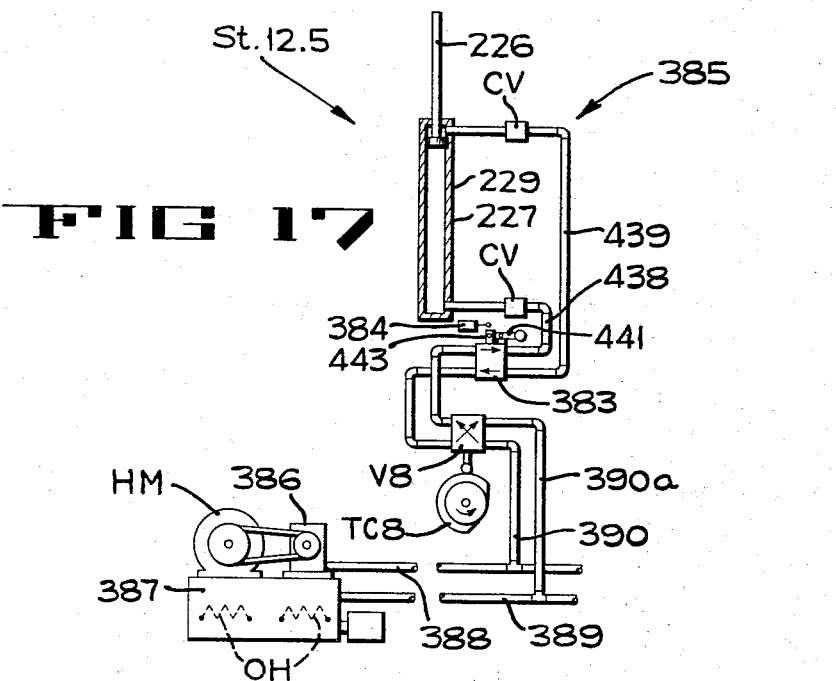
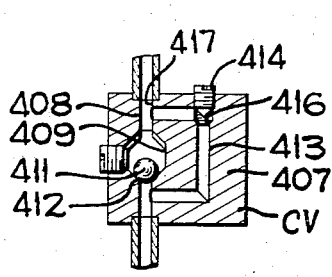
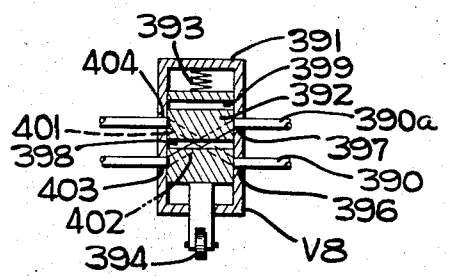

United States Patent Office 3,330,310
Patented July 11, 1967

3,330,310
CARTON FILLING APPARATUS
Robert D. Heffelfinger, Saratoga, Calif., John G. Hagerborg, St. Niklaas-Waas, Belgium, and Wendell S. Thompson and Henry A. Oldenkamp, Saratoga, Calif., assignors to FMC Corporation, San Jose, Calif., a corporation of Delaware
Original application Aug. 10, 1962, Ser. No. 216,248, now Patent No. 3,248,841, dated May 3, 1966. Divided and this application Feb. 11, 1966, Ser. No. 526,726
5 Claims. (Cl. 141—140)

This application is a division of copending application Serial No. 216,248, which application was filed on August 10, 1962 and issued on May 3, 1966 as Patent No. 3,248,841.

The present invention pertains to packaging equipment and more particularly relates to an apparatus for filling containers with a product such as milk or the like.

One object of the present invention is to provide a filling valve for filling an accurately measured quantity of milk into each carton.

Another object is to provide an improved filling valve having a filling tube which is insertable into a carton and is arranged to discharge milk into a carton below the level of the milk therein during a major portion of the filling operation.

These and other objects and advantages of the present invention will become apparent from the following description and the accompanying drawings, in which:

FIGURE 1 is a perspective of a carton forming and filling machine of which the carton filling apparatus of the present invention is a part, the view being taken looking at the elongated left side and the relatively narrow rear end of the machine.

FIGURE 2 is a diagrammatic elevation of the right side of the carton forming and filling machine, certain protective housings being removed.

FIGURE 3 is a diagrammatic plan of the machine on FIGURE 2.

FIGURE 4 is a diagrammatic front elevation of the machine of FIGURE 2, taken looking in the direction of arrows 4—4 of FIGURE 2.

FIGURE 5 is an enlarged vertical section taken along lines 5—5 of FIGURE 2 showing the carton filling apparatus.

FIGURE 6 is an elevation of the right side of the carton filling apparatus of FIGURE 5.

FIGURE 7 is a vertical central section taken along lines 7—7 of FIGURE 6 viewing the support column of the filling apparatus.

FIGURE 8 is an enlarged horizontal section taken along lines 8—8 of FIGURE 7.

FIGURE 9 is an exploded perspective of the mechanism for guiding the filling valve for vertical movement.

FIGURE 10 is an enlarged elevation looking in the direction of arrows 10—10 of FIGURE 5 showing a portion of the actuating mechanism of the milk measuring mechanism.

FIGURE 11 is an enlarged vertical section taken along lines 11—11 of FIGURE 5.

FIGURE 12 is an enlarged vertical section taken along lines 12—12 of FIGURE 6.

FIGURE 13 is an enlarged side elevation looking in the direction of lines 13—13 of FIGURE 6 and showing the mechanism for operating the foot valve of the carton filling apparatus.

FIGURE 14 is a horizontal section taken along lines 14—14 of FIGURE 13.

FIGURE 15 is an enlarged plan of a no-carton no-fill device looking in the direction of the arrows 15—15 in FIGURES 5 and 16.

FIGURE 16 is a section taken along lines 16—16 of FIGURE 15.

FIGURE 17 is a diagrammatic elevation illustrating that portion of the hydraulic system associated with the carton filling mechanism.

FIGURE 18 is a central section through one of several four way hydraulic valves used in the hydraulic system.

FIGURE 19 is a central section through one of the speed control valves in the hydraulic system.

FIGURE 20 is a chart illustrating the timing of the hydraulic power unit of that portion of the hydraulic system used in the carton filling mechanism.

*General description*

The carton filling apparatus 48 of the present invention forms a part of a carton forming and filling machine 50 (FIGS. 1 to 4) which will be shown and described as a machine for packaging milk in half gallon cartons C, it will be understood however, that it is within the scope of the present invention to fill other liquids into either half gallon or other size cartons. Because of the numerous operations performed on the cartons as they pass through the machine, the different sections of the machine at which successive operations on the carton are carried out will be identified as consecutively numbered stations St. 1 through St. 18.

As best shown in FIG. 3, the illustrated embodiment of the machine has two processing lines L1 and L2, each of which processes cartons at the rate of twenty cartons per minute. In the description to follow, when parts associated with the lines L1 and L2 are identical, only those parts associated with one of the lines will be described in detail. It is to be understood that it is within the scope of the invention to provide as many lines as needed to achieve the desired rate of discharge.

The carton forming and filling machine 50 has two main sections: a carton erecting section which is disposed at the front or left hand end of the machine (FIGS. 2 and 3) and includes stations St. 1–St. 8, and a carton filling and closing section which includes stations St. 9–St. 18. In general, between stations St. 1 and St. 8 a carton is erected and placed on a turret 51 and its bottom is closed and sealed. In the carton filling and closing section, a conveyor assembly 52 is mounted on a frame 53 and includes two endless chain, carton supporting conveyors 52a and 52b (FIG. 3) which advance the cartons along the lines L1 and L2, respectively. A magazine 54 at Station 1 is mounted on the frame 53 and is arranged to receive a stack of tubular carton blanks 56 (FIG. 5) in flat folded form. In the magazine, the blanks are held in upright position extending transversely of the magazine with the end of the blank, which forms the top of the carton when it is erected, disposed lowermost in the magazine. The magazine 54 includes means for urging the carton blanks 56 rearwardly in the machine toward a carton erecting and turret loading apparatus 57 (FIG. 2) at Station 2. This erecting and loading apparatus 57 removes one carton blank at a time from the magazine, for each line, squares each carton blank into an open ended rectangular tube, and moves each of the squared tubular carton blanks downwardly at Station 3 over one of six carton forming mandrels 58 in the associated processing line which are carried by and are evenly spaced around the turret 51.

The turret 51 and conveyors 52a and 52b are intermittently driven by a drive mechanism 59 which is timed so as to require approximately six-tenths of a second for each increment of movement and to allow each carton to remain at each station for approximately two and four-tenths seconds. As shown in FIG. 2, intermittent indexing of the turret 51 advances the cartons along an arcuate counterclockwise path from Station 3 to Station 8 during which time operations are performed on the bottom of the cartons, an intermittent movement of the conveyor 52a and 52b advances the cartons along a linear path from Station 9 to Station 18 during which time operations are performed on or are associated with the tops of the cartons. It will be understood that the drive mechanism 59 drives the turret 51 so that each indexing motion of drive 59 advances each mandrel 58 from one station to the next, however, each indexing motion only advances the conveyors 52a and 52b in half-station increments and therefore cartons on conveyors 52a and 52b will come to rest between stations.

When a carton is positioned at Station 4, a bottom forming apparatus 62 is actuated to force a bottom forming die 63 against the lower end flaps of the carton thereby causing the end flaps to bend at their score lines as shown in FIG. 8A. At Station 5, a bottom heating apparatus 64 (FIG. 2) is placed into operation and directs hot air at only those surfaces of the bottom flaps which will subsequently be sealed together by a bottom sealing apparatus 66 (FIG. 4) at Station 6. The carton with its bottom flaps sealed together at Station 6 is then moved past Station 7 (FIG. 2) which is a vacant station, and into Station 8 at which time high pressure air is directed against the interior face of the bottom wall of the carton through the associated mandrel 58 to eject the carton from the mandrel.

The ejected carton C is guided by a carton transfer and turning mechanism 68 which moves the carton from the inverted to an upright position while at the same time turning the carton 90° about its longitudinal axis. The so-turned carton is received at Station 9 between two adjacent drive lugs 69 of the associated conveyors 52a and 52b.

While at Station 10, a top forming apparatus 71 moves a top forming head 72 downwardly against the upper flaps of the carton to bend these flaps along the score lines so that the upper end of the carton assumes the position shown in FIG. 9A. The carton is then indexed to Station 11 where a sterilizing apparatus 73 moves an ultraviolet light 74 into the carton to thoroughly sterilize the interior of the carton. After the carton has been sterilized, it is moved to Station 12.5 where the carton filling apparatus 48 of the present invention fills the carton with milk. The filled carton is then moved to Station 14 under a top sizing apparatus 77 which operates to bend additional portions of the top closure into the proper position for heating.

The carton is then moved by the associated conveyor 52a or 52b into Station 14.5 where a top heating apparatus 78 lowers a heating head 79 over the top flaps of the carton, which head 79 is formed so as to direct hot air only at those surfaces of the top flaps which are to be pressed together to seal the top of the carton. After the top flap surfaces have been properly heated, the associated conveyor indexes the carton to Station 15 where a top sealing apparatus 82 forces the heated surfaces of the flaps together to seal the top of the carton.

The conveyor then advances the filled carton to Station 16, which is a vacant station where sample cartons may be removed from the conveyor for testing if desired. When the carton is moved to Station 17, a top stamping apparatus 83 impresses suitable identifying idicia thereon. The filled, sealed, and marked carton is finally advanced to station 18 where it is moved laterally off the conveyor by a discharge apparatus 84 onto one of two high speed discharge conveyors 86 which are parallel to conveyors 52a and 52b and discharges the carton from the carton forming and filling machine 50 of the present invention.

*Turret and conveyor drive mechanism*

As mentioned previously, the turret 51 and conveyors 52a and 52b are driven intermittently, each movement of the turret moving a carton from one station to the next, while each indexing movement of the conveyors advances cartons thereon only one-half the normal distance between the stations along the conveyors. The length of each indexing movement of the conveyors will be referred to hereinafter as a half-station increment. The drive mechanism 59 (FIGS. 2, 3 and 4) is so timed that approximately six tenths of a second is required for each intermittent movement, and the cartons remain in each station or between stations along conveyors 52a and 52b, for approximately two and one half seconds.

The drive mechanism 59 (FIGS. 2, 3 and 4) comprises a drive motor DM which is connected to a gear reducer 192 by a belt drive 193. The motor DM is mounted on a plate 194 (FIG. 4) which is pivoted at its rearward end on a pair of stub shafts 195 projecting from a fixed bracket 200, and has its forward end supported for vertical adjustment by a bolt 196 which is pivoted to the motor plate 194 and extends through a horizontal plate portion of the bracket and is locked in adjustable position by nuts 198. One output shaft (not shown) of the gear reducer 192 is coupled to a Ferguson drive 199 which drives its output shaft 201 intermittently.

The output shaft 201 is coupled to the turret shaft 210a by a coupling 202. The coupling 202 comprises identical axially aligned sprockets 203 and 204 which are keyed to the shafts 210a and 201, respectively, and have a double chain 206 trained therearound. A connector 207 is used to clamp the ends of the chain 206 together, with the chain fitted firmly around the sprockets 203 and 204.

The conveyors 52a and 52b are accurately timed with the turret and are partially driven directly from the turret 51 by a gear 210 which is keyed to the turret shaft 210a.

The gear 210 meshes with a first idler gear 208 which, in turn, meshes with a second idler gear 209. The idler gears 208 and 209 are journalled on stub shafts 211 and 212, respectively, which are secured to the frame 53 of the machine. The second idler gear 209 meshes with a conveyor drive gear 213 which is keyed to a conveyor drive shaft 214. The shaft 214 (FIG. 2) is journalled on the frame 53. Thus, the conveyors 52a and 52b are intermittently driven to the right (FIGS. 2 and 3) in timed relation with the movement of the turret 51.

*Carton filling apparatus*

After the cartons in lines L1 and L2 have been sterilized at Station 11, they are indexed by three intermittent movements of the conveyors 52a and 52b into Station 12.5 under the filling apparatus 48 (FIGS. 5 to 14) of the present invention. The filling apparatus includes a vertically movable filling head 221 (FIGS. 5 and 6) servicing each line L1 and L2, each head featuring a filling tube 222 which is projected down into the carton being filled to within approximately one-half inch from the bottom of the carton before a foot valve 223 is opened to release the milk from the tube. After the initial portion of milk enters the carton, the filling head is raised allowing the remaining portion of the milk to enter the carton while the lower end of the tube 222 is below the surface of the milk. This "bottom filling" feature permits rapid filling of the carton without foaming.

Each filling head 221 is secured to a cross head 224 (FIGS. 5 and 7) which is connected to the piston rod 226 (FIG. 7) of a hydraulic power unit 227 by a yoke 228. The cylinder 229 of the power unit 227 is connected to a base plate 231 which is bolted to the frame 53 of the machine. The cross head 224 includes a slide block 232 (FIG. 9) that is slidably received within a tubular pillar 233 (FIG. 8) of rectangular cross section. The side walls 234 and end walls 236 of pillar 233 are bolted together and to a head plate 237 (FIG. 7) and to the base plate 231 to provide a rigid guide for the cross head 224.

In order to assure accurate sliding movement and transverse positioning of the cross head 224, the slide block 232 is provided with four angled corner slides 238 (FIGS. 8 and 9) of a self-lubricating bearing material. Each angle slide 238 is connected to the body 239 of the slide block 232 by cap screws 241 which extend through horizontal slots 242 in the angle slide 238 and permit horizontal adjustment thereof. Accurate horizontal positioning of cooperating pairs of the angle slides 238 is achieved by wedges 243 which contact angled edges 244 of the slides 238 and are connected to the body 239 of the slide block 232 by cap screws 246 which extend through vertical slots 247 in the wedges and are screwed into the body 239. The wedges are locked from vertical movement by set screws 248 that abut the wedges and are screwed in tabs 249 welded to the body 239. The set screws 248 are locked in fixed position by jam nuts 251.

The cross head 224 includes a tubular member 252 that is welded to the body 239 and projects outwardly from the pillar 233 through slots 253 in the side walls 234 thereof. Mounting blocks 254 (FIG. 5) are welded to each end of the member 252 and each block 254 has one of the filling heads 221 bolted thereto.

The two filling heads 221 and the structure for operating each head are identical, therefore, the description of the head associated with line L1 will suffice for both.

The filling head 221 (FIGS. 5 and 6) associated with line L1 receives milk at a relatively low pressure from a conduit 257 connected between a surge tank or the like (not shown) and a valve housing. The milk enters a central inlet passage 259 (FIGS. 11 and 12), the outlet of which communicates alternately with one of two upwardly inclined passages 261 and 262 in response to periodic rotation of a directional control valve 263 having a fluid deflecting web 263a therein which is integral with two circular end walls 263b that are mounted for rotation in the housing 258. When the web 263a of the valve 263 is positioned to establish communication between the inlet passage 259 and either one of the inclined passages 261 or 262, the valve also establishes communication between the other inclined passage and a discharge port 264. The discharge port 264 (FIG. 12) communicates with the filling tube 222 which is bolted to the lower end of the housing 258 and which is normally closed by the foot valve 223 so that all the passages will at all times be filled with milk and accordingly be free of air.

In order to accurately determine the volume of milk to be filled into the cartons, a measuring cylinder 266 (FIGS. 11 and 12) is formed in the housing 258 and has a free floating piston 267 therein. The upper ends of the inclined passages 261 and 262 communicate with opposite ends of the measuring cylinder 266.

The piston 267 includes a central dividing wall 268 having cylindrical skirts 269 projecting outwardly from each side thereof. A plurality of discharge holes 271 are formed in each skirt 269 so as to permit rapid transfer of milk between the cylinder 266 and the inclined passages 261 and 262 when the piston is at either end of its stroke. One end of the cylinder 266 is closed by an end cap 272 which is sealed to the wall of the cylinder 266 by an O-ring 273. A central stem 274 of the end cap 272 acts as an abutment to limit the amount of movement of the piston 267 to the left (FIG. 11). An angle tab 276 formed on end cap 272 projects over the cylinder wall and has a threaded aperture to receive a threaded stud 277 having a resilient plug 278 secured to one end and a wing nut 279 secured to the other end. The resilient plug 278 is normally seated in an air vent 280 in the wall of the cylinder 266 to close the vent. During initial filling of the cylinder with milk, this vent may be opened to bleed air from the left end (FIG. 11) of the cylinder.

The other end of the cylinder 266 is closed by a centrally apertured end cap 281 which is threaded to receive a stroke adjusting abutment screw 282. The screw 282 is sealed to the end cap 281 by an O-ring 283, and the end cap 281 is sealed to the wall of the cylinder 266 by an O-ring 284. A vent 286 in the right end of the cylinder is closed by a resilient plug 287 that is secured to a threaded stud 288 screwed into a tab 289 of the end cap 281. A wing nut 291 secured to the stud 288 provides means for easily opening and closing the vent 286. The stroke of the piston 267 may be easily varied and, accordingly, the volumetric capacity of the measuring cylinder may be changed by screwing the stroke adjustment screw 282 in or out and by locking the screw in adjusted position by a wing nut 292. The end caps 272 and 281 are locked in position by rods 293 (FIGS. 5 and 6) having reduced portions which are fitted in slots 294 in the cap 272, and threaded end portions which are fitted in slots 296 in the end caps 281. Wing nuts 297 screwed on the threaded end portion hold the end caps 272 and 281 firmly against the cylinder 266.

The directional control valve 263 (FIG. 12) is held from lateral movement in the housing 258 by one of the mounting blocks 254 and by a plate 301 which is bolted to the housing 258. One end of thte conduit 257 is welded to the upper end of the plate in register with a hole 302 which communicates with the aforementioned inlet passage 259. The lower end of the plate 301 is apertured and fitted around a large diameter portion of the stem 303 of the valve 263. A spacer ring 304 is fitted around an intermediate diameter portion of the stem 303 and bears against a ratchet 306 (FIGS. 10 and 12) which is keyed to a small diameter portion of the stem 303. A pawl-carrying valve actuating arm 307 is welded to a sleeve 308 which is journalled on the small diameter portion of the stem 303. Suitable bearing rings 309 are provided to facilitate relative rotation between the valve 263 and the plate 301, and to facilitate relative rotation of the arm 307 between the ratchet 306 and an end plate 311 that is secured to the stem 303 by a wing bolt 312. The arm 307 is urged in a clockwise direction (FIG. 10) by a torsion spring 313 which is connected between the arm 307 and a cap screw 314 secured to the plate 301. The extent of pivotal movement of the arm 307 is limited by a pin 316 secured to the plate 301.

A stub shaft 317 is welded to the actuating arm 307 and pivotally carries a pawl 318 which is resiliently urged against the ratchet 306 by a torsion spring 319 connected between the arm 307 and the pawl 318.

The foot valve 223 (FIG. 12) includes a disc 322 having an O-ring 323 on its periphery which seals against the beveled lower end 324 of the filling tube 222. The foot valve 223 includes diametrically extending pins 326 which hold the foot valve centrally in tube 222 as the valve moves between the open and closed position.

The foot valve 223 is pivotally connected to an actuating mechanism 327 by a link 328. The actuating mechanism 327 (FIGS. 13 and 14) is of the overcenter-lock type and includes a shaft 329 journalled in a support housing 331 which is bolted to and may be considered part of the filling tube 222. A lever 332, to which the link 328 is connected, is rigidly secured to one end of the shaft 329 (FIG. 14). An actuating arm 333 is clamped at an intermediate point to the other end of the shaft and has a cam follower 334 journalled on one end. The other end of the actuating arm 333 is slotted to define a fork 336 (FIG. 13) which receives a pin 337 projecting outwardly from an overcenter locking arm 338. The arm 338 is pivoted intermediate its ends on a shouldered bolt 339 which is screwed into the housing 331. A spring 341 is connected between the slotted end of a cap screw 342 that is secured to the other end of the locking arm 338, and the slotted end of a cap screw 344 secured to the actuating arm 333 at a point between the shaft 329 and the cam follower 334.

It will be apparent that the spring 341 will lock the actuating lever 333 and foot valve in the closed position as indicated in solid lines in FIGURES 12 and 13 when the lines of action of the spring 344 lies below the axis of the shaft 329. Conversely, the spring 344 will lock the actuating lever 333 and the foot valve in the open position as indicated in dotted lines in FIGURES 12 and 13 when the line of action of the spring 344 lies above the axis of the shaft 329.

During normal operation of the carton filling apparatus 48 (FIGS. 5 and 6) the control valve 263 is rotated 90° during each downward movement of the filling tube 222 into a carton and completes such rotation slightly before the tube reaches the bottom of its stroke. The control valve 263 is rotated upon engagement of the actuating arm 307 with a cam follower 348 (FIG. 5) that is journalled on the upper end of an arm 349. The arm 349 is pivotally mounted on a shouldered bolt 350 that is screwed into a bracket 351 secured to the tubular pillar 233. A stop 352 that is bolted to the bracket 351 is secured to the pillar 233 and engages the lower end of the arm 349 to limit the amount of counterclockwise movement of the arm 349. A leaf spring 354 is mounted on the bracket 353 and normally urges the arm 349 against the stop 352.

In the event a carton is not indexed into filling position at Station 12.5 a no-carton no-fill device 356 (only the device associated with line L2 being shown in FIG. 5) will sense the absence of the carton and will send a signal to a solenoid 357 to energize the same. Energization of the solenoid 357, which solenoid is connected to the arm 349 and is mounted on the bracket 351, pivots the arm 349 clockwise (FIG. 6) thereby moving the cam follower 348 out of the path of movement of the actuating arm 307. Accordingly, when a carton is not present at the filling Station 12.5, the associated valve 263 will not be rotated upon vertical reciprocal movement of the filling head 221.

Since the structure for operating the foot valve 223 associated with line L2 is better illustrated in FIG. 5 than the identical structure for operating the foot valve of line L1, the line L2 structure will be referred to in describing the operation of the foot valves 223. During normal operation, immediately before the filling tube 222 reaches the bottom of its stroke, the cam follower 334 engages a cam arm 359 which moves the actuating mechanism 327 to the position shown in dotted lines in FIGURE 13 thereby opening the foot valve 223 (FIG. 5) allowing milk to enter and fill the carton as the tube is being raised. Immediately before the tube reaches the top of its stroke, the cam follower 334 contacts a cam 361 that is integrally formed on one end of a bracket 362 bolted to the pillar 233. Contact of the cam follower 334 with the cam 361 actuates the mechanism 327 to close the foot valve 223.

The cam 361 is spaced from the pillar and from a spacer block 363 of the bracket to permit the actuating arm 333 and cam follower 334 to move freely past the cam during the next downward stroke of the filling head 221.

In the event a carton is not indexed at Station 12.5 under the associated filling head 221, the foot valve 223 will not be opened as above described. As indicated in FIGURE 5, the cam arm 359 is pivotally mounted on a shouldered cap screw 364 that is connected to the pillar 233. The cam arm 359 is pivotally connected to a solenoid 366 by a link 367. The solenoid is mounted on a bracket 368 bolted to the pillar 233. The cam arm 359 is normally held in the solid line position of FIGURE 5 against a stop 369 projecting outwardly from the bracket 368 by a spring 371 which is connected between the cam arm 359 and the bracket 368.

When a carton is not present at Station 12.5 in one of the lines L1 or L2, the associated no-carton no-fill device 356 sends a signal to the solenoid 366 associated with that line to energize the solenoid and pivot the cam arm 359 out of the path of movement of the cam follower 334 as indicated in dotted lines in FIGURE 5.

The no-carton no-fill carton sensing devices 356, one being provided for each line L1 and L2, are substantially the same.

The device 356 (FIGS. 15 and 16) comprises a box-like housing 372 which is bolted to the frame 53 and which has a single pole limit switch 373 connected thereto. A U-shaped arm 374, having a carton engaging finger 376 connected thereto, is pivoted on a shaft 377 that is bolted to the housing 372. An L-shaped bracket 378 (FIG. 15) is rigidly connected to the housing and has a stop bolt 379 locked therein, which bolt engages an extension 381 of the arm 374 to limit the movement of the finger 376 toward the conveyor 52a. The finger 376 is urged toward the conveyor 52a by the actuating element 382 of the switch 373 which is spring loaded and engages the U-shaped arm 374. Since the cartons travel substantially end-to-end along conveyors 52a and 52b, the switch 373 will always be closed due to the cartons contacting lever 376. If a carton is missing, the lever swings inwardly, closing the switch 373 and energizes the associated solenoids 357 and 366.

Certain components in the hydraulic system to be described in detail hereinafter control the speed of the filling heads 221 so that they move down quite rapidly and move through their upward strokes at a slower rate. The timing of the filling heads 221 relative to the conveyors 52a and 52b is such that the filling tubes 222 complete the upward stroke shortly after the cartons are filled and the foot valves 223 are closed and, immediately thereafter, the conveyor moves other cartons into Station 12.5. This timing allows maximum time for filling, and permits sufficient time to carry the drop of milk which gradually forms on the end of each foot valve 223 into the next carton.

A manually operated hydraulic valve 383 (FIG. 2) is also provided in the hydraulic system adjacent Station 12.5 to enable the operator to operate the filling heads 221 when the machine is not running. This manual operation of the filling heads 221 permits the operator to purge air from the heads when the heads are being initially filled with milk. An electrical safety switch 384 (FIG. 17) associated with the manual valve 383 prevents automatic operation of the machine unless the manual valve 383 is returned to its normal position.

In the operation of the carton filling apparatus 48 (FIGS. 5 and 6), immediately after cartons on the conveyors 52a and 52b have been indexed into Station 12.5 under the filling heads 221, the filling heads 221 are rapidly lowered. The valve 263 in each head is rotated 90° upon contact with the cam follower 348 to move the valve web 263a (FIG. 11) to the dotted line position. Immediately thereafter the roller 334 of the actuating mechanism 327 (FIG. 5) contacts the cam arm 359 and opens the foot valve 223 to release milk into the carton which raises to a level above the bottom of the filling tube 222. The carton is completely filled with milk as the filling head 221 moves upward and during this time the lower end of the filling tube 222 is always positioned below the level of the milk in the carton being filled. With the web 263a of the valve 263 being in the dotted line position shown in FIGURE 11 during this filling cycle, a portion of the accurately measured quantity of milk in the cylinder 266 on the left side of the dividing wall 268 of the piston 267 flows through the passage 261, past the valve 263, through the port 264, and through the filling tube into the carton. During this time, a fresh supply of milk enters the right end of the cylinder 266 through the conduit 257 (FIG. 12), the inlet passage 259, the valve 263 (FIG. 11), and through the passage 262 into the cylinder, thereby moving the piston 267 against the stem of the end cap 272 assuring that the right end of the cylinder contains an accurately measured quantity of milk. Upon rotation of the valve 263 through 90° during the next cycle of operation of the carton filling apparatus 76, a portion of this milk is discharged into the empty carton positioned at Station 12.5.

If an empty conveyor pocket is indexed at the filling

Station 12.5, the associated no-carton no-fill device 356 will assure that no milk is discharged from the filling head 221 associated with that conveyor.

Hydraulic system

The power unit 227 is incorporated in a hydraulic system 385 (FIG. 17). The actuation of the unit 227 is timed relative to the intermittent movement of the conveyors 52a and 52b (FIGS. 2 and 3) by a timing cam TC8 which operates a four-way hydraulic valve V8. The rate of movement of the piston rod 226 of the power cylinder 229 is controlled during extension and retraction by two speed control valves CV, one valve being placed in each conduit connected to the associated ends of the power cylinder 229 to permit free entry of the hydraulic fluid into the cylinder to restrict to a predetermined rate the discharge of fluid therefrom.

As diagrammatically illustrated in FIGURE 17, the hydraulic system 375 comprises a hydraulic pump 386 which is continuously driven by a motor HM. The pump 386 receives fluid from a sump 387 and discharges high pressure fluid through a manifold 388. The low pressure fluid is returned to a sump 387 from the power cylinder through a manifold 389. The valve V8 is connected to the high pressure manifold 388 and to the low pressure manifold 389 by a high pressure conduit 390 and a return conduit 390a, respectively. A plurality of oil heaters OH are provided in the sump 387 and are controlled so as to maintain the temperature of the hydraulic fluid between 105° F. to 140° F.

As diagrammatically illustrated in FIGURE 18, the valve V8 includes a housing 391 having a shiftable core 392 therein. A spring 393 disposed between the core and housing normally urges a cam follower 394 journalled on one end of the core against the timing cam TC8. The associated high pressure conduit 390 and return conduit 390a, are connected to ports 396 and 397, respectively, in the housing 391. The port 396 communicates either with a straight line passage 398 extending centrally through the core 392, or with a slanted or cross-passage 401 which extends along the periphery of the cylindrical core. Similarly, the port 397 communicates either with a straight passage 399 or with a slanted passage 402, that is formed in the periphery of core 392 on the opposite side of the core passage 401. With this arrangement, the hydraulic fluid can be selectively directed through discharge ports 403 or 404 in the housing 391. It will be understood that each passage 398, 399, 401 and 402 are independent passages and do not communicate with each other.

The two speed control valves CV (FIG. 17) are identical in construction and accordingly the description of one will suffice for both. Each speed control valve CV (FIG. 19) comprises a housing 407 having a straight line passage 408 therethrough. An enlarged portion 409 of the passage 408 has a ball check valve 411 therein which rests against a seat 412 to prevent flow of fluid downwardly (FIG. 19) through the passage 408 but prevents unrestricted flow upwardly (FIG. 19) through the passage 408. A U-shaped control passage 413 in the housing 407 bypasses the ball valve 411 and communicates with opposite ends of the straight line passage 408. An adjustable needle valve 414 cooperates with the frusto-conical seat 416 in the control passage to restrict the downward (FIG. 19) flow of fluid therethrough to thereby control the rate of travel of the piston 226 of the hydraulic power cylinder 229. It will be understood that the needle valve 414 of each speed control valve CV will be adjusted so as to achieve the desired rate of travel of the piston rod 226 of the power cylinder. It will also be understood that the speed control valves CV are all positioned so that the upper port 417, rather than the lower port, is connected to the power cylinder 229.

In order to accurately time the operation of the filling apparatus 48 with the turret 51 and conveyors 52a and 52b, the timing cam TC8 is keyed to a cam shaft 418 (FIGS. 1 to 4) which extends the full length of the machine. A second output shaft 419 (FIG. 4) of the previously described gear reducer 192 has a sprocket 420 keyed thereon which is connected to a driven sprocket 421 (FIG. 2) by a chain 422. The driven sprocket 421 is keyed on an idler shaft 423 which is journalled in a bracket 424 bolted to the frame 53. A large diameter cam shaft drive sprocket 425 is keyed on the idler shaft 423. A chain 427 (FIG. 4) is trained around the large diameter sprocket 425, around a sprocket 428 keyed to the cam shaft 418, and around an idler sprocket 430 that is journalled on a shaft 431 secured to the frame 53. The cam shaft 418 extends the full length of the machine 50 (FIG. 2) and is journalled in spaced brackets 432 secured to the frame 53. The timing cam TC8, as well as a plurality of similar timing cams, are secured at spaced intervals along the cam shaft 418. The cam TC8 controls the actuation of the hydraulic power unit 227 of the filling apparatus 48.

The control of the hydraulic power cylinder 229 at Station 12.5 will now be described in detail having reference to FIGURES 17 and 20.

In regard to the chart shown in FIGURE 20, it will be understood that the darkened areas indicate the time required for the piston rod 226 of the associated piston to move from the extended to the retracted positions or from the retracted to the extended positions and that pressure will be applied to the same side of the piston in a dwell period after movement is completed until the associated cam TC8 shifts the valve V8 to its other position. The lines marked S.V. correspond to the sloping portions of the associated cam TC8 which shifts the valve V8 between the cross-passage position and the straight passage position. The time required for the valve V8 to shift from one position to the other will not be included in the description to follow but, as shown in FIGURE 20, each shifting of the valve requires approximately 0.1 second. In the description to follow, it will be understood that the term "cross-passage position" indicates the position at which the passages 401 and 402 register with the conduits 388 and 389, and the term "straight passage position" indicates the position at which the passages 398 and 399 register with the conduits 388 and 389.

As indicated at the top of FIGURE 20, the conveyor and turret indexing operation takes place in the first 0.6 second of the three second operating cycle, and the remaining time is utilized for performing the filling operation while a carton is indexed at Station 12.5 in position to be filled.

As previously mentioned, at Station 12.5 the piston rod 226 is moved from its extended position downwardly into cylinder 227 to move filling tubes 222 into the cartons and is then projected upwardly out of the cylinder. The cylinder 227 which operates the carton filling apparatus 48 of the present invention at Station 12.5 is connected to the valve V8 by conduits 438 and 439 having speed control valves CV therein. The manually operated four-way valve 383 is also positioned in the conduits 438 and 439 between the valve V8 and the speed control valves CV. The manual valve 383 is normally in the straight-passage position as indicated in FIGURE 17. The piston rod 226 of the cylinder 227 is held in the extended position for approximately 0.6 second after the start of a cycle by the cam TC8 which holds the valve V8 in the cross-passage position. The cam TC8 then shifts the valve V8 to the straight-passage position and the speed control valve CV in the conduit 438 controls the flow rate so that the piston rod 226 is moved to its retracted position in approximately 0.43 second. The cam TC8 then returns the valve V8 to its cross-passage position and the rate of movement of the piston 226 is controlled by the speed control valve CV in the conduit 439 so as to require approximately 1.77 seconds for the piston to reach its fully extended position. The valve V8 remains in this position to the end of the cycle.

As mentioned previously, provision is made to operate the carton filling apparatus 48 manually so as to bleed all air from the filling apparatus prior to placing the apparatus into automatic operation. Accordingly, the manual valve 383 is provided and is the same as the valve V8 except that the manual valve 383 is operated by a lever 441 rather than by a cam. When the machine is not operating, the valve V8 is in the cross-passage position shown in FIGURE 17. Accordingly, to manually operate the cylinder 227, the core of the manual valve is merely shifted between its parallel-passage position and cross-passage position by the lever 441. The limit switch 384 is positioned to be opened by an extension 443 of the valve core when the core of the valve 383 is in the cross-passage position. As will be described later, the opening of the switch 384 prevents automatic operation of the machine. Therefore, the core of the manual valve 383 must be returned to the straight line position before the machine can be operated automatically.

From the foregoing description it is apparent that the improved filling apparatus of the present invention accurately measures a quantity of milk and fills the cartons from the bottom thereby preventing foaming. Additionally, the filling valve is actuated in such a way that the milk, which gradually forms on the bottom of a filling tube after one carton has been filled and moved out of the filling station, does not drip from the tube until another empty carton is positioned therebelow.

While one embodiment of the present invention has been shown and described, it will be understood that various changes and modifications may be made without departing from the spirit of the invention or the scope of the appended claims.

The present invention and manner in which the same is to be used having thus been described, what is claimed as new and desired to be protected by Letters Patent is:

1. A carton filling apparatus for filling a carton with liquid comprising means for supporting in upright position a carton having an open upper end, means for measuring a predetermined quantity of liquid, a filling tube connected to said measuring means and disposed above and in axial alignment with the carton to be filled, a control valve disposed between said measuring means and said filling tube, a foot valve for closing the lower end of said filling tube, means for rapidly lowering the filling tube into the carton and thereafter for slowly raising said tube out of the carton, means responsive to the downward movement of the filling tube for shifting said control valve, means operatively connected to said foot valve for opening said foot valve after said control valve has been shifted and prior to the termination of downward movement of said filling tube to permit the measured quantity of liquid to flow into the carton as the filling tube is moved upwardly, and means operatively connected to said foot valve and responsive to the upward movement of the filling tube for closing said foot valve prior to the termination of upward movement of the filling tube.

2. In a machine for forming, filling and closing cartons, a carton filling apparatus comprising means for supporting a carton in position to be filled, means for measuring and storing a predetermined quantity of liquid, a control valve for controlling the discharge of liquid from said storing means, a filling tube for receiving the measured quantity of liquid from said storing means, a foot valve at the lower end of said filling tube for maintaining a column of liquid therein, means for reciprocating said filling tube into and out of said carton, first control means responsive to the movement of said filling tube into the carton for shifting said control valve and for subsequently opening said foot valve immediately before said filling tube reaches its lowermost position in said carton, and second control means for raising said filling tube to displace a measured quantity of liquid into the carton only after the level of liquid has first entered the carton to a depth above that of the lower end of said filling tube and for retaining the lower end of said filling tube below said liquid level during the filling operation.

3. A carton filling apparatus according to claim 2 and additionally comprising an over-center lock connected to said foot valve for moving said foot valve between an open and a closed position and for holding said foot valve in the adjusted position, means operatively connected to said over-center lock for opening said foot valve after said control valve has been shifted and prior to the termination of downward movement of said filling tube, and means operatively connected to said overcenter lock and responsive to the upward movement of the filling tube for closing said foot valve prior to the termination of upward movement of the filling tube.

4. A carton filling apparatus according to claim 3 and additionally including a ratchet secured to said control valve, an arm journalled on said control valve, a ratchet pawl pivotally connected to said arm, and means disposed in position to engage said arm upon downward movement of said filling tube causing said pawl to engage said ratchet and shift said control valve.

5. In a machine for forming, filling, and closing cartons which machine includes an intermittently driven conveyor for advancing cartons along a predetermined path and indexing the cartons one at a time at the filling station, the combination of means for supportings in upright position a carton having an open upper end, means for measuring a predetermined quantity of liquid, a filling tube connected to said measuring means and disposed above and in axial alignment with a carton to be filled, a control valve disposed between said measuring means and said filling tube, a ratchet secured to said control valve, an arm journalled on said control valve, a ratchet pawl pivotally connected to said arm and arranged to engage said ratchet and shift said pawl upon upward movement of said arm, a foot valve for closing the lower end of said filling tube, an over-center lock connected to said foot valve for moving said foot valve between an open and a closed position and for holding said foot valve in an adjusted position, means for rapidly lowering the filling tube into the carton and thereafter for slowly raising said tube out of the carton, a first solenoid, first valve actuating means carried by said solenoid and normally held in position to be engaged by said arm to shift said control valve upon downward movement of said filling tube, a second solenoid, second valve actuating means carried by said second solenoid and normally held in position to be engaged by said over-center lock to open said foot valve after said control valve has been shifted and prior to the termination of downward movement of said filling tube to permit a measured quantity of liquid to flow into the carton as the filling tube is moved upwardly, said lower end of said filling tube being disposed below the liquid level of the carton during the filling operation, and a no-carton no-fill device operatively connected to said solenoid and responsive to the absence of a carton in said filling station to energize said solenoids for withdrawing said first and second valve actuating means from the paths of movement of said arm and said overcenter lock to prevent the discharge of liquid when there is no carton present to collect the liquid.

References Cited
UNITED STATES PATENTS

| | | | |
|---|---|---|---|
| 1,155,009 | 9/1915 | Schlangen | 141—279 X |
| 2,208,028 | 7/1940 | Harrington | 141—248 X |
| 2,536,299 | 1/1951 | Martin | 141—248 |
| 2,839,094 | 6/1958 | Reno | 141—140 X |

LAVERNE D. GEIGER, *Primary Examiner.*

H. S. BELL, *Assistant Examiner.*